Jan. 5, 1943. A. J. SCHENK 2,307,712
CENTRAL STATION DISPATCHING CONTROL SYSTEM FOR CONVEYERS
Filed Jan. 26, 1942 4 Sheets-Sheet 1

INVENTOR.
Adelbert J. Schenk
BY Oliver B. Kaiser

Jan. 5, 1943.  A. J. SCHENK  2,307,712
CENTRAL STATION DISPATCHING CONTROL SYSTEM FOR CONVEYERS
Filed Jan. 26, 1942  4 Sheets-Sheet 3
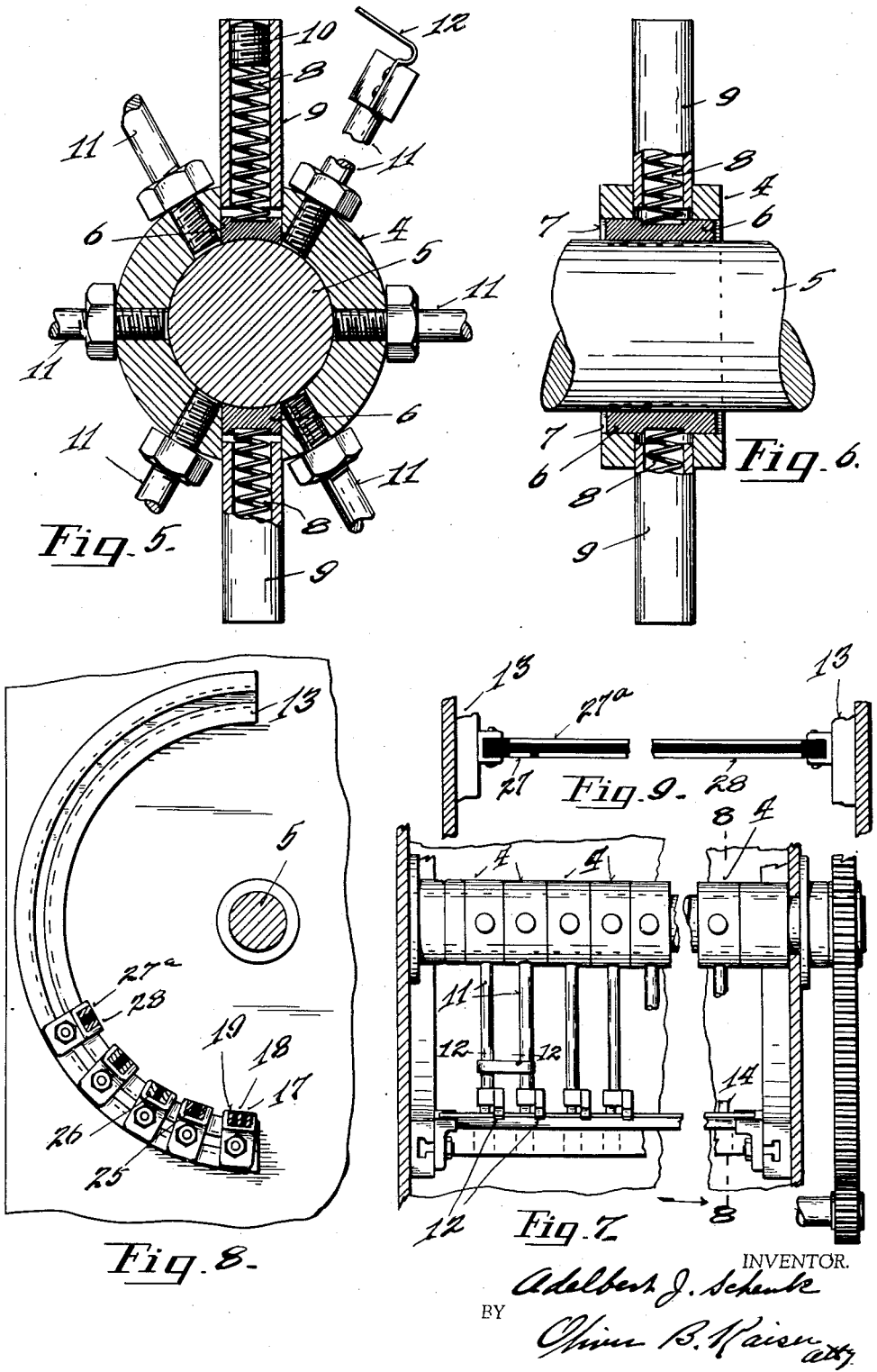

Jan. 5, 1943.　　　　A. J. SCHENK　　　　2,307,712
CENTRAL STATION DISPATCHING CONTROL SYSTEM FOR CONVEYERS
Filed Jan. 26, 1942　　　4 Sheets-Sheet 4
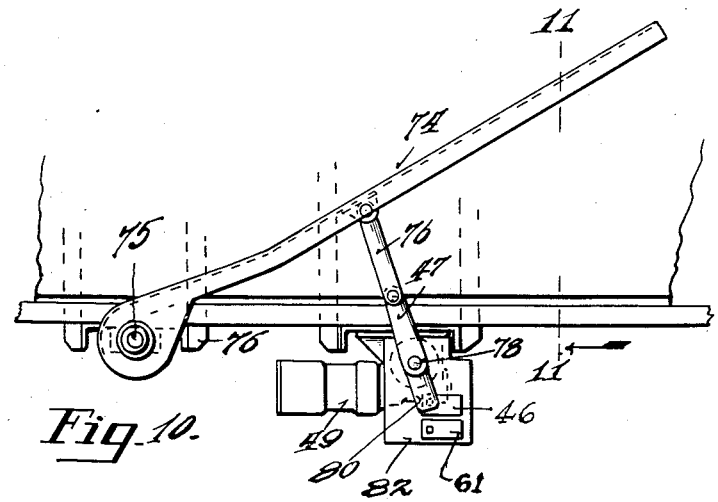
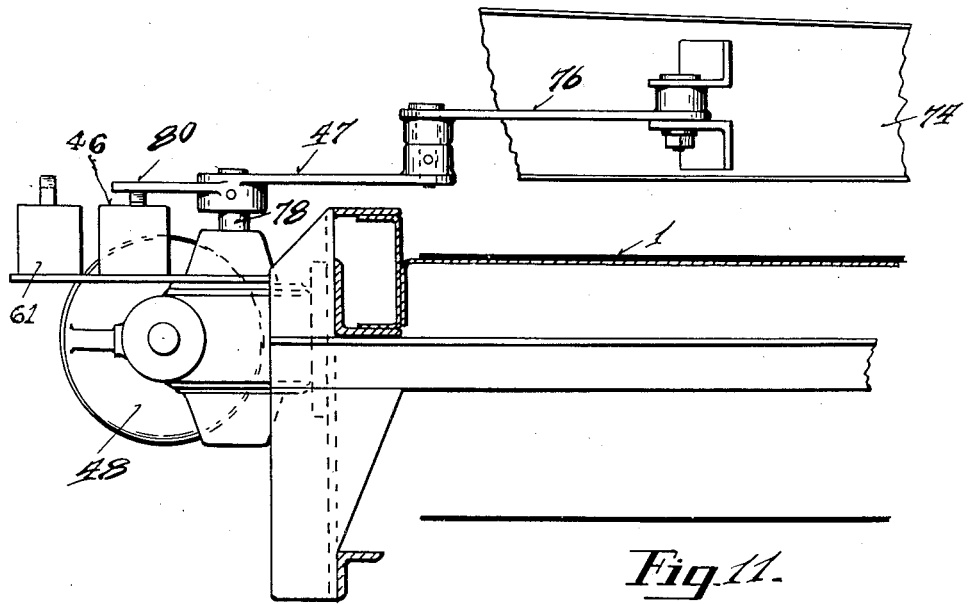
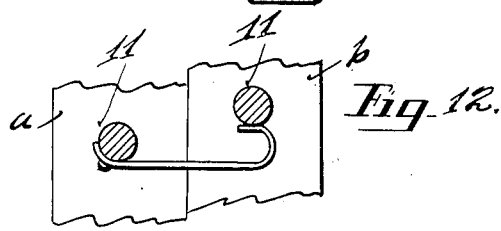
INVENTOR.
Adelbert J. Schenk
BY Oliver B. Kaiser
atty.

Patented Jan. 5, 1943

2,307,712

UNITED STATES PATENT OFFICE 2,307,712

CENTRAL STATION DISPATCHING CONTROL SYSTEM FOR CONVEYERS

Adelbert J. Schenk, Cincinnati, Ohio, assignor to The Alvey-Ferguson Company, Cincinnati, Ohio, a corporation of Ohio Application January 26, 1942, Serial No. 428,311

13 Claims. (Cl. 214—11)

This invention relates to central dispatching control for conveyer systems adapting an operator from a loading or starting point to govern the transmission of an article or a group of articles in trains to selected destinations or stations.

The dispatching system provides for a remote selective automatic control, for the actuation of deflectors located at various respective points along the conveyer system to divert the article or group of articles in trains, while in transit, from one conveyer line onto another, as for example; from a main conveyer line to a selected one of several branch lines and from the branch lines onto a selective one of several sidings for article storage or other service, for transporting to different floors, elevations or distinctive points and to various points or locations on each floor or elevation.

The arrangement and extent of the conveyer system and the number of branch or diverting lines generally varies with each installation as necessitated to meet specific requirements and conditions. A selected conveyer system, for the purpose of exemplification, is disclosed as constituting a main conveyer, as a belt conveyer, roller bed type, consisting of an endless belt having its forward or article carrying run sustained upon and traversing spaced rollers, each journaled in the supporting framing of the conveyer for transporting the articles from a starting or loading point on one floor and extended to serve several floors or elevations thereabove. A branch conveyer for each floor or elevation leads from the main conveyer, each branch conveyer serving several sub-branches or sidings, necessitating the provision of a large number of deflectors for transferring or diverting the articles from one conveyer onto another.

The type of conveyer is optional, provided it is effective for transporting the articles or pieces of merchandise either singly or in train from a starting point to a destination within an approximately definite interval or period of time, adapting timing mechanism separate and distinct from the conveying means to be effective for the timing period allotted for the transmission of an article from the dispatching station to the predetermined station or point of transfer.

The dispatching system primarily controls the operation of deflectors for transfer of the articles from one respective conveyer onto another and at different distances from the starting point, and provides for the control of a comparatively large number of deflectors located at various points throughout several floors of a building.

The speed at which the various conveyer units run is immaterial, as long as it is always constant. A deflector remains in the same position as when last used until necessary to change position for a new condition, making it possible to continuously transport articles to a selected station without further dispatch control until the end of a consignment for the given station has been reached, and a consignment for another station is in order. The control of each deflector from an operative position to an inoperative position is automatically effected when it is necessary to transport an article to a destination or station therebeyond, and as the dispatching control is push-button-operated, it is only necessary to press a single button for a dispatching control to any point of the system. Thus for some destinations, a plurality of deflectors are operated in seriatim as may be required to transport the article to a selected destination.

The dispatching apparatus more particularly concerns the selective diversion of articles or groups of articles from a main to station or branch conveyers occuring at spaced intervals. The merchandise is delivered to the conveyer at a receiving station and dispatched to the proper destination by a dispatcher or operator stationed at or in the vicinity of the receiving station, who presses a proper button or key, whereupon the article or train is started on its journey, and the corresponding actuation of the deflectors necessary for it to reach its destination does not take place until just before the article arrives at the deflector at the station or branch which it is to enter, to avoid any disturbance or intereference to articles preceding it enroute to other destinations.

In arrangements heretofore employed, it was required of the dispatcher to perform two separate operations for a control of each deflector to place the same either in an operative position or inoperative position, adding to the complexity of the control apparatus and confusion of the operator.

Other arrangements provide for the automatic restoration to normal of each deflector immediately after its deflecting function has been completed for any given article or train, and by imposing upon the articles themselves the duty of determining the restoration of the deflector to its normal position. This likewise adds to the complication of the system and results in undue needless operation of the apparatus.

In the present invention a change in the position of the deflectors is only made when such is required and otherwise remains in an operative position until restoration to normal is necessitated to advance the conveyed merchandise therebeyond. This provides extreme simplicity in the system, lowers the operating cost, and materially reduces wear.

The present system also provides for the starting control of a plurality of timing elements or a single timing element with a plurality of controls for each station or destination, operative from a single key or push-button to enable the sending of more than one train during the timing cycle. This gives further points more timing elements than those to nearer points in order to maintain a given or maximum rate of number of trains to any one track in a unit of time, and if the trains are started in successive periods without interveningly transmitting a train to another station, there is no disturbance or operation of the deflectors, so that the dispatching primarily is merely used to effect a starting control.

An object of the invention is to provide a dispatching system for conveyers selectively controlled from a central point for the diversion of articles from one line or conveyer onto another, and from a second line onto a third, and the deflection or diversion automatically controlled after an initial manual starting operation, governed by the unit of time required for transporting the article from the starting station to a diversion point, irrespective of the relative rates of speed the various transporting lines of the conveyer system, over which the article must be transported to reach its destination, are operated, making the speed at which the various units are operated immaterial, as long as the operating speed or speeds are constant.

Another object is to provide a dispatching system for conveyer systems constituting a plurality of independent conveyer lines for selectively diverting the articles from one line onto another and from a second onto a third from a central point or station, as distinguished from controlling the diversion of articles from a single onto one or a plurality of branch lines leading therefrom.

Various other features and advantages will be more fully set forth in the accompanied drawings, in which:

Figure 5 is a detailed central sectional view of a portion of a rotative electric switch member of a timing unit.

Figure 6 is an additional sectional view of the rotative switch member, shown in Figure 5, taken transversally thereto.

Figure 7 is a detailed elevation of a timing switch unit illustrating only a single stationary contact bar, to avoid obscurity.

Figure 8 is a section taken on line 8—8, Figure 7.

Figure 9 is a broken top plan view of one of the stationary contact bars of a timing unit.

Figure 10 is a top plan view of a section of conveyer and a deflector disposed above the conveyer in a closed or operative position.

Figure 11 is an enlarged section on line 11—11, Figure 10.

Figure 12 is an enlarged section on line 12—12, Figure 11.

Figure 1:
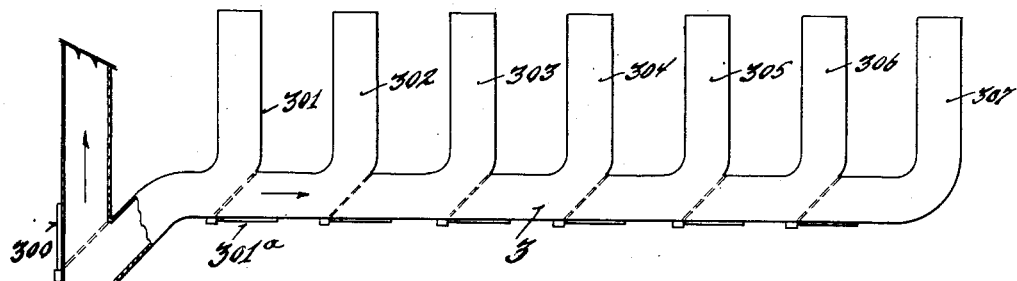
Figure 1 is a diagrammatical plan view of a portion of a conveyer system illustrating a section of the main conveyer, several branch conveyers leading from the main conveyer, and a plurality of sub-branch conveyers leading respectively from each of the branch conveyers.

Referring to the drawings, Figure 1 in diagram exemplifies a conveyer system for serving a plurality of floors of a building with the number of branch lines or conveyers leading from the main line and sub-branch lines leading from the branch lines merely selective for an abridgement in illustration and description.

The conveyer system in detail is of conventional type in which the main and branch lines of conveyers are of belt or chain type, and the sub-branches leading from the branch lines, when used for storage tracks, may be of the conventional roller type, so that specific detailed illustration and description thereof is herein omitted.

Diagrammatically 1 indicates a main conveyer of the belt type, the belt traversing over suitable spaced rollers journaled in the frame structure of the conveyer. The main conveyer may constitute several sections as a level section for loading, unloading and deflecting, and adjoining inclined sections for transfer from a lower to a higher elevation, as from one floor to another, or in tier for a given floor, the installation lay-out being such as to meet a particular type of service which usually varies with each installation.

A branch belt type conveyer 2 leads from the main conveyer 1 and has a plurality of sub-branch conveyers leading therefrom, two herein shown and indicated as 201 and 202. The number, however, is optional and may be selected to meet definite service requirements.

The relative arrangement as to the direction or diversion from either or alternate sides of a conveyer is herein contemplated although, as illustrated for convenience, the diversion is only on one side of a conveyer.

A second branch conveyer 3 is shown as leading from the main conveyer 1 and providing with a plurality of sub-branch conveyers or siding tracks, seven being shown and indicated at 301 to 307 inclusive. The main and branch conveyers each may be driven from any suitable source and preferably are driven independently by means of synchronous speed motors. The speed at which the various units run is not a factor, so long as they are practically constant, and some of the branch conveyers may be driven by standard induction motors, particularly if the conveyers are short and have few deflectors or diverting stations.

It is mainly required that a transporting period of time from a starting point to each of the several destinations to which the merchandise is to be delivered, remain substantially constant for the distance traveled in which the transported articles are to be under a dispatching control. The main line conveyer and dispatching apparatus are driven independently, preferably by means of synchronous speed motors. The dispatching system, therefore, is not necessarily dependent upon traveling at a rate commensurate with that of any particular conveyer or driven in synchronism with a conveyer, particularly as the merchandise is or may be transported over several conveyers not in interconnected driving connection, but only that their relative speeds remain constant to avoid disturbance to a period of time selected for the transportation of the merchandise from a starting point to each of the last diverting points for a given destination, although adjustments for any change in time can be readily accommodated for.

The controlling system for the various conveyer driving motors, as well as a signal system which may be added to the dispatching control for indicating the operation of the various deflectors, is not included herewith as separate and distinct from the present invention, although in an installation it may be desirable to have the controls locked together so that all driving motor controls must be in an operative position, and if any unit in the system stops, all stop and start together. The system may be stopped and started under load and remain in close enough synchronism to function properly, and this primarily to avoid repeated resetting or adjustment of the dispatching control mechanism.

The diverting means or deflectors for transferring the articles from one conveyer onto another or track may be of various forms of constructions, and as depicted herein each preferably constitues a swinging arm fixed upon a shaft journaled upon one side of the conveyer framing and each actuated by its own electric motor in transmission connection with the shaft carrying the deflector arm. In a normal or inoperative position the deflector arm is disclosed substantially parallel to the edge of the belt and out of the path of the articles moving along with the belt. In an operative or active position the deflector arm is moved to an angle across the belt of the conveyer to discharge or direct the articles therefrom, or onto a second conveyer for continued transportation of the articles to a determined destination.

The deflector motor rotates a crank arm in link connection with the deflector arm, the crank arm in each revolution moving the deflector arm from an open or inoperative position parallel with the conveyer, clearing the conveyer, to a closed or operative position across the conveyer to remove articles therefrom and then back to its normal open position. Thus, for each half cycle or revolution of the crank arm, the deflector is moved from an open to a closed position or vice versa. The arrangement permits the motor to automatically cut out its power to stop the same at the end of each half cycle of the deflector arm operating crank, the crank arm at the end of each half revolution cooperating with or actuating an electric circuit controlling limit switch connecting with the deflector motor and thereby provides for a continuous direction of motor and crank rotation, materially simplifying the reconstruction of the control apparatus and control.

The dispatching system provides one or a plurality of rotative switch members as a timing instrumentality which, in an arc of travel, engages or contacts with stationary electric circuit controlling switch bars for completing or partially completing an electric circuit for the cooperating period of the rotative movable and stationary switch members during the continued travel or rotation of the movable switch member. In its arc the movable switch member is adapted to cooperate and contact with a series or plurality of stationary contact bars for controlling the operation of other control instrumentalities or other deflectors in an appropriate order. As shown in Figure 5, the rotative electric switch member for the dispatching apparatus comprises a collar 4 mounted upon a shaft 5 suitably journaled within a frame, the shaft providing for a plurality of collars 4 arranged adjoiningly side by side. Therefore, a plurality of rotating timing switch members is sustained upon a single shaft for correspondingly serving a plurality of deflectors or a plurality of switch members or collars for a single deflector, resulting in a compact arrangement. Each collar of a rotative timing switch member is frictionally clamped or clutched to the shaft for rotatively coupling the collar to the shaft, and allow the same to slip thereon when the rotation of the switch member is positively arrested. The coupling means comprises a friction block 6 seated within a lateral key groove 7 within the collar, the block yieldingly depressed against the periphery of the shaft by a spring 8 having its lower end seated in a pocket in the friction block and housed within a tubular casing 9 fixed into the collar and projecting radially therefrom with the outer end of the bore of the casing carrying a set screw 10 screw-threaded into the casing with its inner end in engagement with the spring for adjusting the tension thereof. A pair of spring pressed friction blocks are relatively diametrically arranged within the collar to obtain a balanced condition. Each collar is provided with one or a plurality of contact carrying arms 11, each at its outer end, in an insulated condition from the arm, carrying one or more contact fingers 12 adapted to brush across ar contact with the stationary contact bars of the timing apparatus.

The shaft 5 and the rotatable timing switch members mounted thereon rotate axially within a cage composed of stationary circuit controlling bars extending parallel with the axis of the shaft, adjustably mounted, and have their opposite ends respectively fixed or adjustably connected to stationary plates 13, as circular supports, respectively mounted on side frames, and from which the stationary contact bars are insulated.

For physical reasons, it is desirable to limit the position of the stationary deflector control bars of a series to less than 180° arc. The maximum time required for an article to move from the starting point to the farthest side track or destination was taken as the time for 180° of rotation of the controlling driving shaft. Those side tracks requiring two-thirds or more of this time to reach destination have rotative timing elements with two arms spaced 180° in the contact arm collars. Those requiring one-fourth to one-half time, have four arms and so on. The rotating timing switch, when containing more than one contact carrying arm, is periodically arrested within a complete revolution and cannot be re-used until one of its arms has come to rest at a starting point, to bridge its contact spring finger across a pair of stationary contact bars to complete a circuit between a bar of the cage connected to a starting push-button and to a solenoid for controlling a latch bar which arrests the rotative motion of the switch member. All of the rotating switch members upon the single shaft are brought to rest at a common line, excepting in instances wherein two or more rotating swtich members are adjoiningly arranged for controlling the same deflector, in which instance the contact arm of one arrests or stops a relative arm of a second rotating switch member, slightly in rear of the arresting point, for effective successive control.

Figure 2:
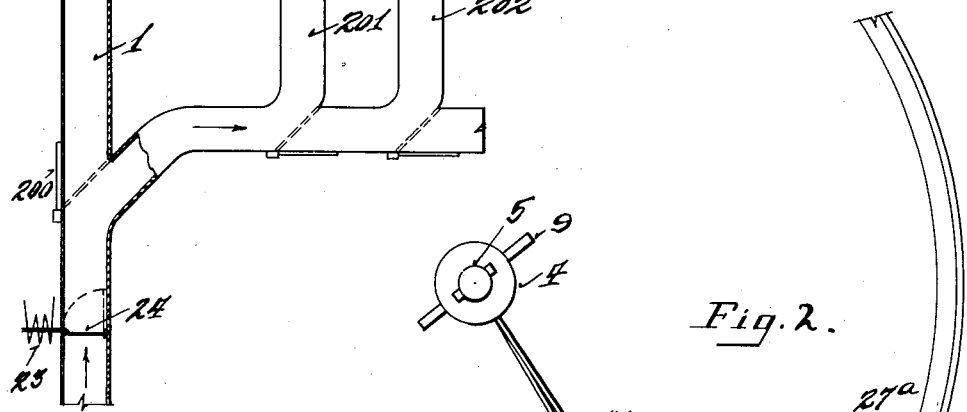
Figure 2 is a diagrammatical side elevation of a rotative electric switch member cooperating with a plurality or series of stationary contact bars, the rotative switch member providing a radial arm having a flexible contact finger at its outer end for bridging or contacting with the stationary bars for establishing electric control circuits for one or a plurality of deflectors.

As shown in diagram Figure 2, the rotation of each rotating switch member a is arrested in its arc of revolution by a latch 14 normally extending in the path of a contact finger-sustaining block on the end of a contact arm 11. The latch is depressed by an electromagnet or solenoid controlled by the contact finger of the arm locked. Thus, upon depressing a dispatcher operated push-button, an electric circuit is completed through the bridging contact of the finger across adjoining stationary contact bars for energizing the solenoid 15 depressing the latch 14, the arm immediately advancing through its frictional connection with the shaft 5 for a deflector control. As soon as the finger is advanced to break the bridging connection across the adjoining pair of stationary contact bars for energizing the latch controlling solenoid, the solenoid is de-energized, releasing the latch for arresting rotation of the rotative switch member as soon as the block of a second arm comes into engagement with the latch.

Some tracks or branch lines may have a group of rotating timing switch members a, b. The purpose of a group is to enable sending more than one train during a timing cycle. To adapt several or a group of rotating timing switch members for duplicate control to function in an orderly and consecutive manner within a given timing cycle, each finger carrying arm 11 of one of the switch members is provided with a cross stop arm 16 (see Figures 3, 7 and 12) extending laterally therefrom to be engaged by a respective arm of a second adjoining rotating switch member to effect a staggered arresting relation between the contact arms of one member and those of a second, and permit only one at a time to be in direct starting position and in engagement with its latch 14 while withholding the arm of a second member ajar from its latch out of contact with the starting stationary control bars.

At the starting point the timing control cage for each rotative switch member of a control unit is provided with three stationary contact bars 17, 18 and 19, suitably spaced. The control bar 18 is of a length to serve two or more rotative switch members serving a common destination deflector, in the present instance two, while the contact bar 19 is of a length to serve all of the rotative switch members of a unit assembled upon a driven shaft. The contact bar 17, by a wire 20, connects with one pole of the solenoid for actuating its latch 14; bar 18, by a wire 21, to a respective push-button of the dispatch control panel, and bar 19, by a wire 22, to a solenoid 23 for releasing a starting gate 24 at the loading station of the main conveyer 1. The contact finger 12 of each rotative switch member, when the member is in direct engagement with its latch 14, bridges a set of contact bars, 17, 18 for energizing the latch solenoid upon completing an electric circuit through a panel push-button. Upon unlatching the rotative switch member it will immediately advance, bringing the contact finger 12 in bridging contact with the bar 17 and bar 19 for energizing the gate releasing solenoid 23 to start an article at the loading station in transit. In the continued rotation or advance of the rotatable switch member it will bridge a second set of stationary contact bars of the control cage for controlling the operation of a deflector in an order necessary to transport the article to a selected or determined destination. Each set of deflector stationary control bars in the control cabinet of a unit is set independently of all others and spaced a distance from the starting point comparable to the distance its deflector is from the starting point of the conveyer or comparable to the period of time required for the article to be transported from the starting point to a respective deflector.

Each rotative timing switch member passes the deflector control bar or set of bars for every deflector between the starting point and the final destination. This tests the position of each deflector just before a train of articles reaches each deflector, and if deflector is not in proper position to pass the train or deflect it, as the case may be, deflector will move to its proper position at that time. The deflectors remain in the same position as when last used until necessary to change positions for new condition.

The main driving shaft in the control cabinet for each unit runs continuously as long as the system is running. The driving shaft operates very slowly, as for example, one revolution in eight and one-half minutes. The arm carrying collars, being frictionally rotated by the shaft, move therewith as their locking latches are released; each collar is independently adjusted and operates independent of its next adjoining collars, and any collar can be adjusted without affecting any others. The frictional force is adjusted to keep the collar locked to the shaft while the contact springs pass the deflector control bars.

Figure 3:
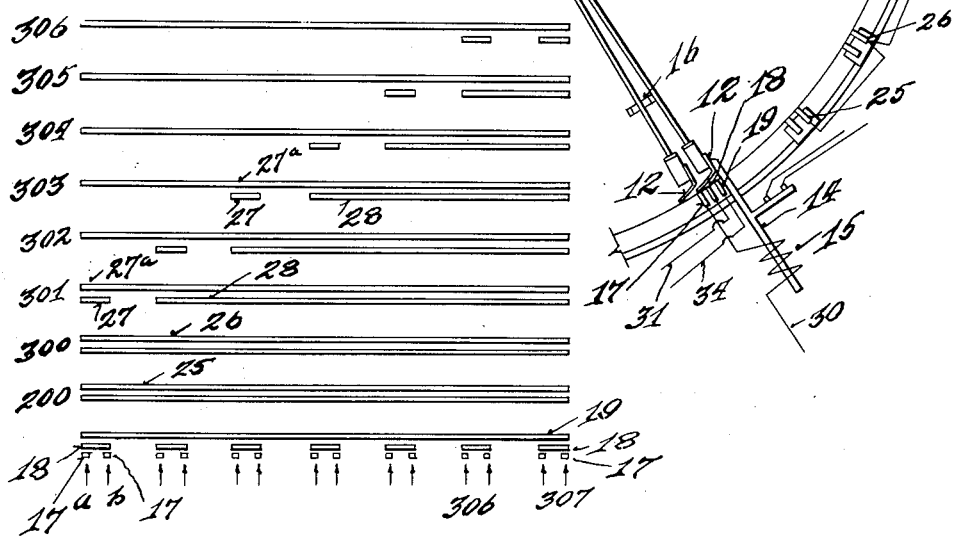
Figure 3 is a diagrammatical plan view of a plurality of stationary contact bars of an electric timing switch unit.

Figure 3 diagrammatically in plan discloses, as an example of lay-out of stationary contact bars, a control unit for serving a conveyer system as diagrammed in Figure 1, to deflect the article or articles in train from the main conveyer 1 onto the second branch conveyer 3 and the sub-branch conveyers or siding tracks 301 to 307 inclusive and includes an opening control for the deflector 200, for the branch conveyer 2. Thus, after a selected rotative switch member has been released, say to dispatch an article to the siding 301, it will, at an appropriate distance or time in its travel, contact with a set of stationary switch bars 25, in this instance, serving all of the rotative switch members of a group or unit on the driving shaft 5. Upon bridging the contact bars 25, an electric circuit will be completed to operate the deflector 200 for the branch conveyer 2 in the main line conveyer to open the deflector should it be stationed in a closed position and permit the article to continue in its transit on the main conveyer to the main conveyer deflector 300. Should the deflector 200 be in an open position, no action takes place, as the deflector motor controlling circuit cannot be closed by the finger bridging the contacts due to the cut-out position of the motor driven crank connecting with the deflector, the open position of the deflector cutting out its motor control. Each rotative switch member serves a definite destination or station and in an operative cycle is effective for advancing and in seriatim, controlling the deflectors located in the route or course to such destination, provided the deflectors are in an alternate position, or require repositioning, and it may be said that it is effective only for a one way position control of the deflectors. This insures that the course will be open for the transmission of merchandise to the destination or station for which the switch member serves. In transmitting merchandise, say to the branch 2 for the sub-branches 201 and 202, a rotative switch member is provided respectively for each of the sub-branches for effecting an operation of the deflector 200 to divert the merchandise from main line conveyer 1 onto the branch line 2 and then operate the appropriate deflector or deflectors in advance of the particular sub-branch in the branch line 2 and the deflector for the sub-branch into which the merchandise is to be transmitted.

The rotative switch element in its continued advance and appropriate order then contacts and bridges a set of stationary contact bars 26 of the unit for closing the control of the motor circuit of the deflector 300 to move the deflector 300 to a closed or operative position for a transfer of the article onto the branch deflector 3. Likewise, if the deflector 300 is in a closed or operative position, no action takes place as the circuit to the motor of the deflector 300 remains in a closed position, until an article has been destined on the main conveyer beyond the deflector 300 when it appropriately would be opened. The rotative contact member in its advance then contacts with a set of stationary contact bars 27, 27a, one of which, 27a, serves as a common line or bar for all of the rotative switch members of a unit, and when its contact finger 12 bridges the contact bars 27, 27a, an electric circuit will be completed to the motor, transmittingly connected with and for the deflector 301a to move the same to a closed position for a transfer of the article to the sub-branch 301 leading from the branch 300. Should a rotative electric switch member be released for a sub-branch beyond sub-branch 301, it will, upon reaching a position in registration or alignment with the set of contact bars 27, 27a, bridge a second set of contact bars 28, 27a for controlling the motor of a deflector 301 to move the deflector to an open position to clear the sub-branch 301 or any other deflector or deflectors it may pass in its course which are not in an open position for an opening operation until it reaches its own set of deflector closing bars. It will thus be observed that each rotative switch member is only effective for closing its deflector at a proper time in its arc of movement before being arrested, but capable of instituting an opening or closing control of every deflector between the starting point and its own deflector. Thus, if a control was set for main conveyer transportation, beyond the last deflector 300, an appropriate rotative timing switch, upon its release and in a timed order, would open deflectors 200 and 300, if closed, to allow the articles to pass said deflectors, and this likewise follows as may be necessary for transporting an article from the starting station or point to a determined station or destination of the conveyer system.

Figure 4:
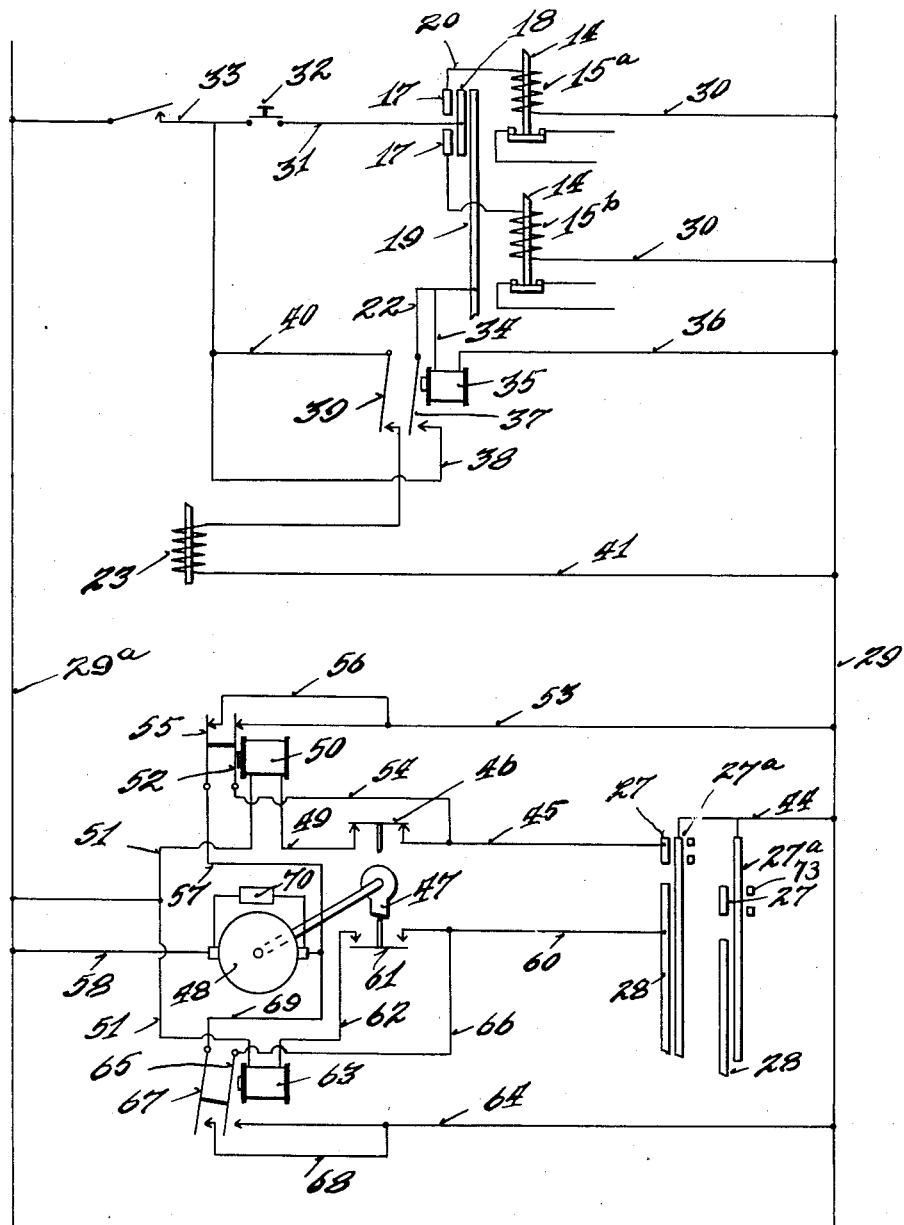
Figure 4 is a wiring diagram of a deflector control lay-out.

Referring to Figure 4 which illustrates a wiring diagram for one deflector having two rotative switch members, 29, 29a indicate the electric service lines. As each rototive switch member is arrested by its own latch, two latch operating solenoids 15a, 15b are provided, each having one end of its magnet winding in connection, by a wire 30, with the service 29, and its opposite end in connection with a respective stationary contact bar 17, as one of the set of three starting contact bars for a starting circuit control position. The second stationary contact bar 18 is of a length to serve both of the rotative switch members of a group, which also follows for the third stationary bar 19. The latter, however, is of a length to serve all of the rotative switch members of a unit. The bars 18, 19, by a wire 31, join with one pole of a push-button switch 32, and the opposite pole of the push-button switch connects, by a wire 33, with the service line 29a. A limit switch is interposed in the partial circuit joining the push-button 32 with the service line 29a. The limit switch is mounted on the starting gate and closed by the pressure of the articles in train on the gate. This, however, is merely an auxiliary feature and may be omitted; also the latch solenoid controls a circuit for a signal or light system, as normally closed contacts, open when the solenoid is energized. The third stationary contact bar 19 of the starting set, in connection with the push-button wire line leading to the service line 29a, also connects, by a wire 34, with the coil winding of a relay 35 and the opposite end of the coil of the relay connects, by a wire 36, with the service line 29. The wire 34 through wire 22 connects with one pole of a switch arm 37 of the relay 35 which contacts with a stationary contact connected by a wire 38 and wire 33 with the service line 29a. The relay contacts are normally open and the relay is energized as soon as the limit switch and push-button are closed, thus locking in its own circuit and holding the same in until the limit switch on starting gate is released. The relay 35 is provided with a second switch arm 39 having one pole connected by a wire 40 to the wire 33 leading and connecting with the service line 29a, and the switch arm 39, when in a closed position, contacts with a stationary contact connecting with the coil winding of a solenoid 23 controlling the starting gate. The opposite pole of the winding of the solenoid 23 is connected by a wire 41 to the service line 29.

A contact finger or brush 12, when the rotative switch member is at rest, normally bridges the starting bars 17, 18 to effect a release of the switch member instantly upon depressing the dispatcher's push-button 32. The rotative member, being frictionally clutched to the driving shaft, is instantly set in motion upon release of the latch and continues until again locked at the end of a dispatching cycle. The moving contacts or fingers, therefore, are used to close a circuit momentarily and not to break a circuit or to maintain it during its cycle. Each rotating switch member has its own separate relay which has a self-locking circuit to hold its magnet energized after the momentary closing of the circuit thereof by the moving finger to allow for any necessary delay under the control of the dispatcher's push-button as may be required for a functioning of the starting gate.

The starting gate serves to withhold dispatching of an article over its course in advance of a dispatcher's starting control which, if permitted, may cause it to be improperly destinated, and also provides for loading upon the conveyer a group of articles in train before being set in transit.

A rotative switch member, in its moving cycle, cooperates with the deflector control starting contact bars in its path making contact across each set successively for a deflector opening or closing control, just before the train reaches each deflector, as may be necessary in its routing to reach its selected destination.

As a further explanation of the operation of the system from the present drawing disclosures, assume that it is desired to transmit an article to branch line 2, as diagrammed in Figure 1 and that the wiring diagram Figure 4 is primarily for the control of the deflector 200 in the main conveyer line. The dispatcher upon closing the push-button 32, starts a rotative switch arm 11 into operation, which as it moves in its cycle into cooperation with the stationary contacts 27—27a, it will complete a starting circuit for the motor 48 for the deflector 200, whereupon the motor would move the deflector into an operative or closed position and at the end of the deflector movement the motor will have moved the crank arm 47 to an alternate position to open the limit switch 46, thereby bringing the motor to rest. The crank arm 47 in such instance will have departed from the limit switch 61, allowing it to be automatically closed. The switch as it leaves the contacts 27—27a continues until arrested at an end of an arc or operative cycle. The deflector remains in its closed position until alternated by a second rotative switch serving for another destination in which it is necessary to move the deflector 200 to its alternate or open position. Repeatedly closing the control or dispatch button 32 for dispatching to the branch line 2, while the deflector is in a closed position, the limit switch 46 would be in an open position, ineffective for a control of the deflector 200.

Now assume that it is desired to transmit to branch 3 upon pressing an appropriate push-button 32, starting a rotative switch arm into motion, referring to Figure 4, such second switch arm upon contacting stationary bars 28—27a would complete an energizing circuit with the motor 48 for the branch deflector 200 causing its motor to move the deflector 200 to an open position and upon the second switch arm for the deflector 300 coacting with the stationary contacts 27—27a beyond and at one side of the corresponding contacts described for the deflector 200 would complete an energizing circuit for the motor operating deflector 300 when in an open position to move the same to a closed position for deflecting the article from the main line conveyer 1 onto the branch 3. For transporting articles on the main line beyond the deflectors 200 and 300, a third rotative switch arm is set into motion, which, at a proper time interval, would appropriately complete a circuit respectively to the motors for the deflectors 200 and 300 and in sequence contacts with a set of bars 28—27a for control with a deflector 200 and a second set of contact bars 28—27a for the deflector 300.

For closing a deflector a set of stationary contact bars 27, 27 included in the cage of the timing unit are located at an appropriate distance from the stationary starting contact bars or from any intervening stationary contact bars for the control of other deflectors, and represent the last or final control bars for a given rotative switch member, so that the closing contact bars 27, 27a are individual for a given rotative switch member, while one of the bars, 27a, is common for the group of rotative switch members included in a timing unit. The common bar 27a connects by a wire 44 to the service line 29 and the individual bar 27 connects by a wire 45 with one pole of a limit switch 46. The movable switch member of the limit switch 46 is actuated by a crank arm 47 in transmission connection with an electric motor 48 employed for individually operating a deflector. The limit switch 46 preferably is self-closing and normally closed when not engaged by the crank arm 47. Should the crank arm 47, however, be in cooperation with the limit switch 46, in which instance the deflector operated by the motor 48 would be in a closed or operative position, neutralizing the control circuit for a closing of the deflector, as the deflector would be in a position at last used and require no change for a new condition. The opposite pole of the limit switch 46 connects by a wire 49 with the coil windings of a relay 50, and the opposite end of the coil winding connects by a wire 51 with the service line 29a. When the limit switch 46 is in its closed position and the finger 12 of the rotating switch member bridges across the contact bars 27, 27a, a circuit for the relay 50 will be established, energizing the same, which will result in the relay completing a holding circuit through its armature lever 52 being in a closed position, bridging a stationary contact respectively connecting by a wire 52 to the service line 29 and by a wire 54 in connection with the wire 45 for completing a relay holding circuit through the limit switch 46, which is in closed position, and thence through the coil of the relay 50 by wires 49, 51 in connection with service line 29a. Energizing or closing the relay 50 establishes and completes a circuit through an armature or switch lever 55 companion to or cooperating with the armature lever 52, closing a circuit through a wire 56 coupled to wire 53 or in connection with the service line 29 and by a wire 57 with one pole of the electric motor 48. The opposite pole of the motor 48 is connected by a wire 58 with the service line 29a. The electric motor, upon starting, will continue in operation for moving its deflector to a closing position and transmit the crank arm 47 one-half of a revolution, bringing the same into cooperation with the limit switch 46 to move the same into an open position, breaking the power circuit to the motor 48 to bring the same to rest with the deflector in a closed or operative position. The parts remain in such position until controlled by a second rotative switch member when its contact finger bridges a stationary contact bar 28 in alignment with the individual bar 27 and companion with the common bar 27a, completing a circuit through a wire 60, one end connecting with the bar 28 and with a terminal of a second limit switch 61, which may be designated as a deflector opening switch. When the deflector is in closed position, the crank arm 47 cooperates with the first limit switch 46 holding the same open, and the second limit switch released by the crank arm 47 is closed for establishing a circuit through a wire 62 connecting with an opposite terminal of the limit switch 61 with the coil windings of a second relay 63, and thence through a wire 51 with the service line 29a.

The second relay, similar to the first relay, includes a holding circuit through a wire 64 at one end connecting with service line 29, thence through the armature lever 65 of the relay 63 and by a wire 66 with the wire 60. A switch lever 67 companion with the armature or switch lever 65 of the relay 63, when the relay is energized, completes a partial circuit through a wire 68 connecting with the wire 64 or directly with the service line 29 and by a wire 69 with one pole of the electric motor 48.

The electric motor is preferably provided with a solenoid brake 70 to prevent overrun.

For convenience and to simplify installation it is preferable, particularly when a large number of deflectors are under a dispatching control, to group in a unit the deflectors reached in the same general direction or routing to thereby reduce the number of individual stationary control bars to be passed by a single rotating switch member, as is exemplified in diagram Figure 3. In such selected lay-out, common stationary control bars 25 serve all of the group of rotating switch members of a unit to open the main conveyer deflector 200, and a common control bar 27 to close the deflector 300 of the main conveyer.

In an operation, assuming that the dispatcher selects the siding 301 as a destination for dispatching an article, and upon depressing the appropriate push-button which is suitably identified, immediately a latch solenoid 15a or 15b, whichever happens to be in a proper order, through its respective control by a switch finger bridging the contact bars 17, 18, energizing the latch solenoid. The latch is pulled down for releasing the arm. The finger of the arm then makes contact with the bar 19 connected to the starting gate relay 35 which closes, energizing a solenoid 23, which pulls down a latch, releasing the starting gate. The article or train starts on its course and the arm continues its rotative cycle, moving past the deflector control bars in its path, making contact with each one successively, and just before the train reaches each deflector. The arm for the selected destination 301, when it moves across the first set of stationary contact bars 25, opens the deflector 200 if the same should be in a closed position, and then as it cooperates with the stationary contact bars 26, will effect a closing of the deflector 300 if the same should be in an open position. The arm, as it continues in its cycle, then contacts with the individual bar 27 and common bar 27a which closes the deflector 301, whereupon after it passes beyond the bars 27, 27a, the rotative switch member is arrested by a second finger carrying arm coming into engagement with the latch. The finger, as it passes the deflector control bars 27, 27a, bridges across the common bar 27a and a bar 73, as shown in Figure 4 for signal control which, however, is separate and apart hereof.

When a second switch member for a given selected destination, say for either of the sub-branches 302 to 307 inclusive, passes onto the control bars 28, 27a, 28 being in registration or alignment with the deflector closing control 27, the motor for the deflector 301 will be set in operation to open the deflector 301.

From the foregoing, it will be readily recognized that each rotating switch arm has only a closing control for its own deflector, although it may have an opening or closing control as in advance of its own deflector closing control for other deflectors which the article must pass in its routing and which run within the control of a dispatcher push-button. The dispatcher, therefore, is relieved of the necessity of actuating several push-buttons to obtain a definite dispatching control and is never concerned with any resetting of any of the deflectors. The last deflector of a series controlled by a single rotative switch member always remains in a closed position unless it is necessary to dispatch an article to a destination therebeyond which would require a change of position of the deflector from its open to a closed position.

The deflectors may be of various designs arranged to swing on a horizontal or vertical axis, or of a type as commonly employed in the conveyer art and capable of operation through the medium of an electric motor wherein its operative control can be limited only to impart a full movement of the deflector from one of its limits to another, adapting the motor power to be cut off at the end of a movement to bring the deflector into either its open or closed position with the motor preferably operating in one direction.

In Figures 10 and 11, the deflector 74 is shown as an arm sustained in a horizontal plane and fixed upon a vertical axis or shaft 75 journaled in a bracket 76 fixed to a side frame of the conveyer. Deflector in its closed position extends at an angle across and slightly above the belt of the conveyer. The deflector 74, at an intermediate point and rear side thereof, is pivotally connected to one end of a link 76. The opposite end of the link 76 connects with a crank lever 47 fixed upon the shaft 78 of an electric motor 49 of a conventional gear motor unit. The motor 49 is suitably mounted upon a base plate fixed to the side framing of the conveyer. The crank 47, in a half cycle or revolution, imparts a full movement to the deflector. The motor operates in one or the same direction for moving the deflector to either closed or open position, and operates at an interval necessary to impart a half revolution to the crank arm 47.

The crank is provided with a tail extension 80 for actuating or cooperating with an electric limit switch indicated in diagram 46 mounted upon a plate 82 fixed upon the gear casing of the motor for cutting off the power to the motor and stops the deflector in closed position. The tail extension is disposed in an off-set relation to the arm portion of the crank or at a different level therefrom so that it is only effective for operating the limit switch 46.

A second electric limit switch 61 is preferably located adjacent the limit switch 46 and arranged to be actuated by the arm portion of the crank 47 when it has moved to bring the deflector to an open position. The arm of the crank is disposed at a high elevation to miss or clear the limit switch 46 as it passes thereover. When either the tail extension or the arm of the crank engages with its respective limit switch, the electric power to the motor is cut off and stops the deflector at an appropriate position. Thus, the limit switches are alternately active and when released by the crank, are self-closing to establish a partial circuit to the motor and function as has been heretofore described.

The limit switches are of conventional type and, therefore, need not be disclosed or described in detail herewith.

Having described the invention, I claim:

1. A dispatching control system for conveyers, comprising: in combination with a conveyer, a deflector for diverting articles from the conveyer, an electric motor for moving the deflector into and out of an operating position, electric switches having an element in transmission connection with the motor for motor starting and a self-stopping control at the end of a deflector movement into or out of an operative position, a rotative timing controller for establishing a self-holding energizing circuit for said electric motor at a predetermined interval in an operative cycle and rotative at a rate commensurate with the time of transport of the article to said deflector and for a positioning control thereof within a cycle or portion thereof slightly in advance of the article reaching the same, when the deflector is in an alternate position, and for a sequential control of auxiliary deflectors located in the course effective for the transporting of the article to a determined destination, and means for arresting said timing controller at the end of each cycle, electrically operated and under electric push-button control to release the timing controller for a successive operating cycle.

2. A dispatching control system for conveyers, comprising: a deflector for diverting articles from a conveyer, an electric motor for moving the deflector into and out of an operating position, an electric limit switch positively operative at the end of a deflector movement into or out of an operative position for cutting out the motor energizing circuit, a timing controller for establishing a self-holding energizing circuit for said electric motor at a determined period in an operative cycle thereof to move the deflector into an operative position, and means for arresting said timing controller at the end of a cycle, electrically operated and under electric push-button control to release the timing controller for a successive operating cycle, said deflector remaining in an operative position until a change to an alternate position is required and instituted by a second timing controller effective for another designation.

3. A dispatching control system for conveyers, comprising: a deflector for diverting articles from a conveyer, an electric motor for moving said deflector to and from an operative position, a timing controller for starting said motor into operation at a predetermined period in an operative cycle of said timing controller for moving the deflector into an operative position, the motor cutting out its energizing circuit at the end of each deflector movement, and a second timing controller for a deflector stationed at a point along the conveyer to be reached by the articles passing said first deflector for establishing an energizing circuit to said motor to move the first deflector from an operative position at a properly timed period in advance of an operative control of said second deflector.

4. A dispatching control system for conveyers, comprising: a deflector for diverting articles from one conveyer onto a second conveyer, an electric motor for moving said deflector to and from an operative position, a timing controller for starting said motor into operation at a predetermined period in an operative cycle of said timing controller for moving the deflector into an operative position, slightly in advance of the articles conveyed reaching said deflector, the motor cutting out its energizing circuit at the end of each deflector movement, and a second deflector stationed at a point along second conveyer to be reached by the articles passing said first deflector controlled by said timing controller, for establishing an energizing circuit to the motor of said second deflector a properly timed period after an operative control of said first deflector.

5. A dispatching control system for conveyers, comprising: a plurality of deflectors for diverting articles from the conveyer, an electric motor individually for each deflector for moving it into and out of operative position, electric switch means for each deflector for effecting a motor stopping control at the end of a deflector movement either into or out of an operative position, a timing controller for each deflector, a continuously operating medium for all of said timing controllers, each controller adapted to be released for an operative cycle for establishing a self-holding motor energizing circuit at relative intervals in an operative cycle thereof for the deflector or deflectors to be passed by an article to reach a destination for which the timing controller is selective, and means for arresting each timing controller at the end of a cycle, electrically operated under electric push-button control, while the timing controller is stationed at its arrested position to release the same for a successive operating cycle.

6. A dispatching control system for conveyers, comprising: a deflector for diverting articles from the conveyer, an electric motor for moving the deflector into and out of operative position, and a timing controller for said deflector, comprising: a continuously rotating shaft, a rotatable timing switch wheel frictionally connecting with said shaft normally locked against rotation, said timing switch wheel carrying a contact for cooperation with a stationary contact positioned in an arc and at a determined distance from a starting point of a rotative cycle of said wheel carried contact for establishing a deflector motor energizing circuit for a deflector operation in advance of the time a conveyer transported article reaches the deflector, and means for arresting the timing switch wheel at the end of a cycle with its contact in a starting position of the cycle, electrically operated under electric push-button control, when the timing switch wheel is arrested with the contact at the starting point to release the same for a successive operating cycle.

7. A dispatching control system for conveyers, comprising: a deflector for diverting articles from the conveyer, an electric motor for moving the deflector into and out of operative position, and a timing controller for said deflector, comprising: a continuously rotating shaft, a rotatable timing switch wheel frictionally connecting with said shaft normally locked against rotation, said timing switch wheel carrying a plurality of uniformly spaced contacts for cooperation with a stationary contact positioned in and traversed by said wheel contacts and located a determined distance from a starting point of a rotative cycle of said wheel carried contact for establishing a deflector motor energizing circuit for a deflector operation in advance of the time a conveyer transported article reaches the deflector, and means for arresting the switch wheel when one of its contacts reaches a starting point in a wheel cycle, said means electrically operated under electric push-button control, to release the timing wheel for a successive operating cycle.

8. A dispatching control system for conveyers, comprising: a deflector for diverting articles from the conveyer, an electrically operated means for moving the deflector into and out of operative position, and a timing controller for said deflector, comprising: a continuously rotating shaft, a plurality of rotatable timing switch wheels adjoiningly and frictionally mounted upon said shaft and normally locked against rotation, each timing switch wheel carrying a plurality of uniformly spaced contacts for cooperation with a stationary contact positioned in an arc traversed by said wheel contacts and located a determined distance from a starting point of a rotative cycle of said wheel carried contact for establishing a deflector motor energizing circuit for a deflector operation in advance of the time a conveyer transported article reaches the deflector, means for arresting the switch wheel when one of its contacts reaches a starting point in a wheel cycle, said means electrically operated under electric push-button control, to release a timing wheel for a successive operating cycle, and means carried on one switch wheel for engaging the adjoining switch wheel, for effecting a staggered relation of the contacts of said wheel, to permit only a single contact to be stationed at the starting point when the rotation of the wheel has been arrested.

9. A dispatching control system for conveyers, comprising: a plurality of deflectors for diverting the articles from the conveyer at various points thereof, an electric motor for each deflector for moving it into and out of operative position, and a timing controller for each deflector, comprising: a rotatable timing switch wheel frictionally mounted upon a continuously rotative shaft and normally locked against rotation, the shaft serving a group of switch wheels, said timing switch wheel carrying a contact for cooperation with a stationary contact positioned in an arc and at a determined distance from a starting point of a rotative cycle of said wheel carried contact for establishing a deflector motor energizing circuit for a deflector operation in advance of the time a conveyer transported article reaches the deflector, and means for arresting the timing switch wheel at the end of a cycle with its contact in a starting position of the cycle, electrically operated under electric push-button control, when the timing switch wheel is arrested with the contact at the starting point to release the same for a successive operating cycle.

10. A dispatching control for one or a plurality of deflectors of a conveyer system, comprising one or more deflectors each stationed at a determined location from a loading station of the conveyer for diverting the articles transported from one conveyer onto another or from either thereof for delivery to a destination station, each deflector moved into and out of an operative position by its individual motive power electrically controlled, and cutting out its own energizing electric circuit at the end of a position movement, a timing controller separate and distinct from the conveyer means, having a rotative contact selective for a deflector, movable for sequential cooperation with stationary contacts for other deflectors and including its own, determinately positioned within an arc, traversed by said movable contact in a rotative cycle thereof for establishing an energizing circuit for each deflector in advance of the article reaching a determined distance from each respective deflector for a control thereof to transport the article to the designation for which said rotative contact is selective.

11. A dispatching control for one or a plurality of deflectors of a conveyer system, comprising one or more deflectors each stationed at a determined location from a loading station of the conveyer for diverting the articles transported from one conveyer onto another or from either thereof for delivery to a destination station, each deflector moved into and out of an operative position by its individual motive power electrically controlled, and cutting out its own energizing electric circuit at the end of a position movement, a timing controller having a continuously rotating shaft separate and distinct from the conveyer transmission, a rotatable contact frictionally clutched to said shaft and movable therewith for sequential cooperation with the stationary contacts determinately positioned within an arc, traversed by said movable contact in a rotative cycle thereof for establishing an energizing circuit for each deflector in advance of the article reaching a determined distance from each respective deflector for a control thereof to transport the article to the designation for which said rotative contact is selective.

12. A dispatching control for one or a plurality of deflectors of a conveyer system, comprising one or more deflectors each stationed at a determined location from a loading station of the conveyer for diverting the articles transported from one conveyer onto another or from either thereof for delivery to a destination station, each deflector moved into and out of an operative position by its individual motive power electrically controlled, and cutting out its own energizing electric circuit at the end of a position movement, a timing controller having a continuously rotating shaft separate and distnct from the conveyer transmission, a rotatable contact frictionally clutched to said shaft and movable therewith for sequential cooperation with the stationary contacts determinately positioned within an arc, traversed by said movable contact in a rotative cycle thereof for establishing an energizing circuit for each deflector in advance of the article reaching a determined distance from each respective deflector for a control thereof to transport the article to the designation for which said rotative contact is selective, and means for automatically arresting said rotatable contact at a starting position of a rotative cycle to position the same for a subsequent operation, and electrically operated by a push-button controlling circuit to release the rotatable contact for an operative cycle.

13. A dispatching control for one or a plurality of deflectors of a conveyer system, comprising one or more deflectors each stationed at a determined location from a loading station of the conveyer for diverting the articles transported from one conveyer onto another or from either thereof for delivery to a destination station, each deflector moved into and out of an operative position by its individual motive power electrically controlled, and cutting out its own energizing electric circuit at the end of a position movement, a timing controller having a continously rotating shaft separate and distinct from the conveyer transmission, a rotatable contact unit, one selectively for each deflector, each independently frictionally coupled to said shaft, and in its traverse within an arc cooperating sequentially with selective stationary contacts, one for each deflector, for establishing an energizing circuit for each deflector in advance of the article reaching a determined distance from each respective deflector for a control thereof in the transportation of the article to the designation for which a rotative contact is selective, each to sequentially cooperate with said stationary contacts, and means for independently arresting each rotatable contact unit after a contact thereof has moved beyond the arc for cooperation with the stationary contacts, and station a second contact at a starting point and electrically operated for movement to release the contact unit by an energizing circuit selectively, manually controlled.

ADELBERT J. SCHENK.